US011621666B2

(12) United States Patent
Salari et al.

(10) Patent No.: US 11,621,666 B2
(45) Date of Patent: Apr. 4, 2023

(54) HYBRID SOLAR/MOTOR DRIVE INVERTER

(71) Applicant: Sparq Systems Inc., Kingston (CA)

(72) Inventors: Omid Salari, Kingston (CA); Ryan Fernandes, Kingston (CA); Abhishek Awasthi, Kingston (CA); Majid Pahlevaninezhad, Kingston (CA); Praveen Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 116 days.

(21) Appl. No.: 17/139,588

(22) Filed: Dec. 31, 2020

(65) Prior Publication Data

US 2022/0209713 A1  Jun. 30, 2022

(51) Int. Cl.

| H02P 27/12 | (2006.01) |
| H02S 40/32 | (2014.01) |
| H02S 40/38 | (2014.01) |
| H02P 21/22 | (2016.01) |
| H02P 21/18 | (2016.01) |

(52) U.S. Cl.
CPC ............. *H02S 40/32* (2014.12); *H02P 21/18* (2016.02); *H02P 21/22* (2016.02); *H02P 27/12* (2013.01); *H02S 40/38* (2014.12)

(58) Field of Classification Search
CPC .......... H02S 40/32; H02S 40/38; H02P 21/18; H02P 21/22; H02P 27/12
See application file for complete search history.

(56) References Cited

U.S. PATENT DOCUMENTS

| 8,612,058 B2 | 12/2013 | Khajehoddin |
| 8,638,571 B2 | 1/2014 | Tschirhart |
| 8,688,287 B2 | 4/2014 | Khajehoddin |
| 9,692,320 B2 | 6/2017 | Mascioli |
| 9,859,714 B2 | 1/2018 | Pahlevaninezhad |
| 9,935,562 B2 | 4/2018 | Eren |
| 10,063,057 B2 | 8/2018 | Eren |
| 2007/0103004 A1* | 5/2007 | Chou ........................ H02J 3/38 307/64 |
| 2014/0176026 A1* | 6/2014 | Saussele ................. H02J 3/381 323/299 |
| 2016/0084891 A1* | 3/2016 | Kim .......................... H02J 3/38 324/76.53 |
| 2016/0164440 A1* | 6/2016 | Kataoka ............ H02M 7/53871 318/400.3 |
| 2017/0018932 A1* | 1/2017 | Pahlevaninezhad .... H02J 3/386 |
| 2020/0343728 A1 | 10/2020 | Bagawade |

* cited by examiner

*Primary Examiner* — Rina I Duda
(74) *Attorney, Agent, or Firm* — Brion Raffoul

(57) ABSTRACT

Systems and methods for use with renewable energy resources that provide power to an energy power grid or to one or more motor loads. A control system along with an energy storage/combiner block and a DC/AC inverter is used to condition DC power received from renewable energy sources. The control system receives current and voltage outputs from the inverter along with values indicating current and voltage outputs directly from the renewable energy sources. These are then used to estimate and control motor speed when the system is in the off-grid mode. In addition, the control system uses these inputs to provide the gate pulses that are used to control the three phase AC output power from the inverter.

19 Claims, 8 Drawing Sheets

HYBRID SOLAR/MOTOR DRIVE INVERTER

TECHNICAL FIELD

The present invention relates to power generation. More specifically, the present invention relates to systems and methods for use with power generation systems using renewable energy sources with supply loads such as motors.

BACKGROUND

The recent interest in environmentally friendly technologies has led a boom in the deployment of renewable energy resources. In particular, solar energy offers a clean and reliable solution for future power generation. An increasing number of houses worldwide are now being equipped with solar panels (also referred to as photovoltaic or PV panels) to supply power for household energy needs. These PV panels can also be used to feed power to the existing power infrastructure (i.e., the power grid). One of the main applications of solar energy harvesting systems is in agriculture. In particular, solar energy harvesting systems can provide power for water pumps used for irrigation.

There are several issues with current solar energy harvesting systems used for applications such as irrigation. One potential issue with current systems is that quite a few of these systems are ill equipped to reliably operate in both on-grid (connected to the power grid) and off-grid (disconnected from the power grid) modes. A number of these systems are only suitable for grid-tied applications where the inverter system (coupled to the PV panels) must stop generating the power as soon as there is an AC power failure or an outage. This is required for the safety of the personnel who may be working on the power grid to repair the fault.

In distributed PV electricity generation, the inverters are typically co-located with or are at least physically close to local loads. The safety of the personnel working on the power grid can be ensured by disconnecting the local loads from the power grid using a circuit breaker. With the local loads now disconnected from the power grid, the inverters can be operated and used in supplying power to these local loads. This mode of operation is called 'off-grid'.

To improve the utility of PV installations, the PV inverters coupled to the PV panels should be able to operate in both the grid-connected mode (on-grid) or in a stand-alone mode (off-grid). The off-grid mode requires the PV-connected microinverter to operate with a variety of loads (e.g., motors) and/or with any type of renewable energy sources including power generators, wind turbines, fuel cells, battery storage systems, and the like.

Another main issue with existing solar inverters is that they may not reliably perform as a motor drive system. This is because the solar inverters do not usually provide a substantial power storage capacity. Thus, the DC-bus in the inverter cannot be considered as an infinite bus as is the case for motor drive applications. Consequently, the dynamics of the DC-bus can detrimentally affect the operation of the motor drive and the PV or renewable power based system may not be reliable.

Another issue is that, while existing solar inverters may be able to operate with one type of motor (e.g., induction motor), these do not work with all types of motors. The issue is that various types of motors may be used in different applications. Thus, the solar inverters should be able to operate with different types of motors to broaden their applicability. For instance, for irrigation systems, induction motors have traditionally been used. However, it is expected that Brushless DC (BLDC) and Permanent Magnet Synchronous (PMS) motors will soon replace the induction motors in these and many other applications. If current solar inverters are unable to work with non-induction motors, this limits the applicability of renewable energy sources.

Motor drive systems usually require speed sensors to be able to control the speed of the motor. However, solar inverters usually cannot embed such speed sensors as these are separate from the motor. Thus, using speed sensors is not very practical, especially with solar inverters. While there are several speed sensor-less techniques for motor drive systems, these existing sensor-less techniques are usually very complex, require high computational resources, and do not offer reliable performance in various applications.

Yet another issue with current solar inverters is that they may not reliably operate when multiple inverters are used to supply one or more motors. Multiple inverters may not be able to perform appropriate current sharing or they may suffer from circulating current freewheeling between the paralleled units. This may saturate the magnetic filters at the AC side of the inverters or of the electric motors and may also reduce the system efficiency. Moreover, using multiple inverters in parallel is challenging as these inverters may not be well synchronised to provide reliable power for the motor load.

There is, therefore, a need for systems and methods that allow PV inverters to reliably operate in both on-grid and off-grid modes. As well, there is a need for systems and methods that allow PV inverters to supply various loads including different types of electric motors. Preferably, such systems and methods are able to automatically switch from one mode to another.

SUMMARY

The present document describes systems and methods for use with renewable energy resources that provide power to an energy power grid or to one or more motor loads. A control system along with an energy storage/combiner block and a DC/AC inverter is used to condition DC power received from renewable energy sources. The control system receives current and voltage outputs from the inverter along with values indicating current and voltage outputs directly from the renewable energy sources. These are then used to estimate and control motor speed when the system is in the off-grid mode. In addition, the control system uses these inputs to provide the gate pulses that are used to control the three phase AC output power from the inverter.

In one aspect, the present invention provides a system for delivering power from a renewable energy source to at least one destination in either an on-grid mode or an off-grid mode, the system comprising:

at least one DC/DC converter coupled to receive DC power from a renewable energy source;

an energy storage and combiner module receiving power outputs of said at least one DC/DC converter;

a DC/AC inverter receiving an output of said energy storage and combiner module and producing AC power;

a control subsystem receiving output current and output voltage readings from said DC/AC inverter, said control subsystem providing gate control signals to said DC/AC inverter and to each of said at least one DC/DC converter;

wherein when said system is in said on-grid mode, said AC power from said DC/AC inverter is delivered to a power grid;

when said system is in said off-grid mode, said AC power from said DC/AC inverter is delivered to at least one electric motor;

said control subsystem includes a current controller block that, during off-grid mode, outputs intermediate control signals used to determine said gate control signals, said intermediate control signals being based on sensed current and voltage values from said inverter, said sensed current and voltage values being indicative of a performance of said at least one electric motor.

In another aspect, the present invention provides a method for controlling at least one motor load coupled to a power generation system, the method comprising:

receiving a reference power value indicative of DC power received from at least one energy source;

receiving indications of current and voltage outputs from said at least one energy source as feedforward values;

using said feedforward values, said reference power value, and a sensed direct axis current to produce a direct axis duty cycle;

receiving output voltage values from an inverter within said power generation system, said inverter producing AC power from DC power from said at least one energy source, said AC power being for use by said at least one motor load;

estimating a frequency of said voltage values;

using said frequency as an estimated speed of said at least one motor load, producing a quadrature axis duty cycle using said estimated speed, a sensed quadrature axis current, and a motor speed reference value;

converting said direct axis duty cycle and said quadrature duty cycle to produce gate control signals for power semiconductors in said inverter.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
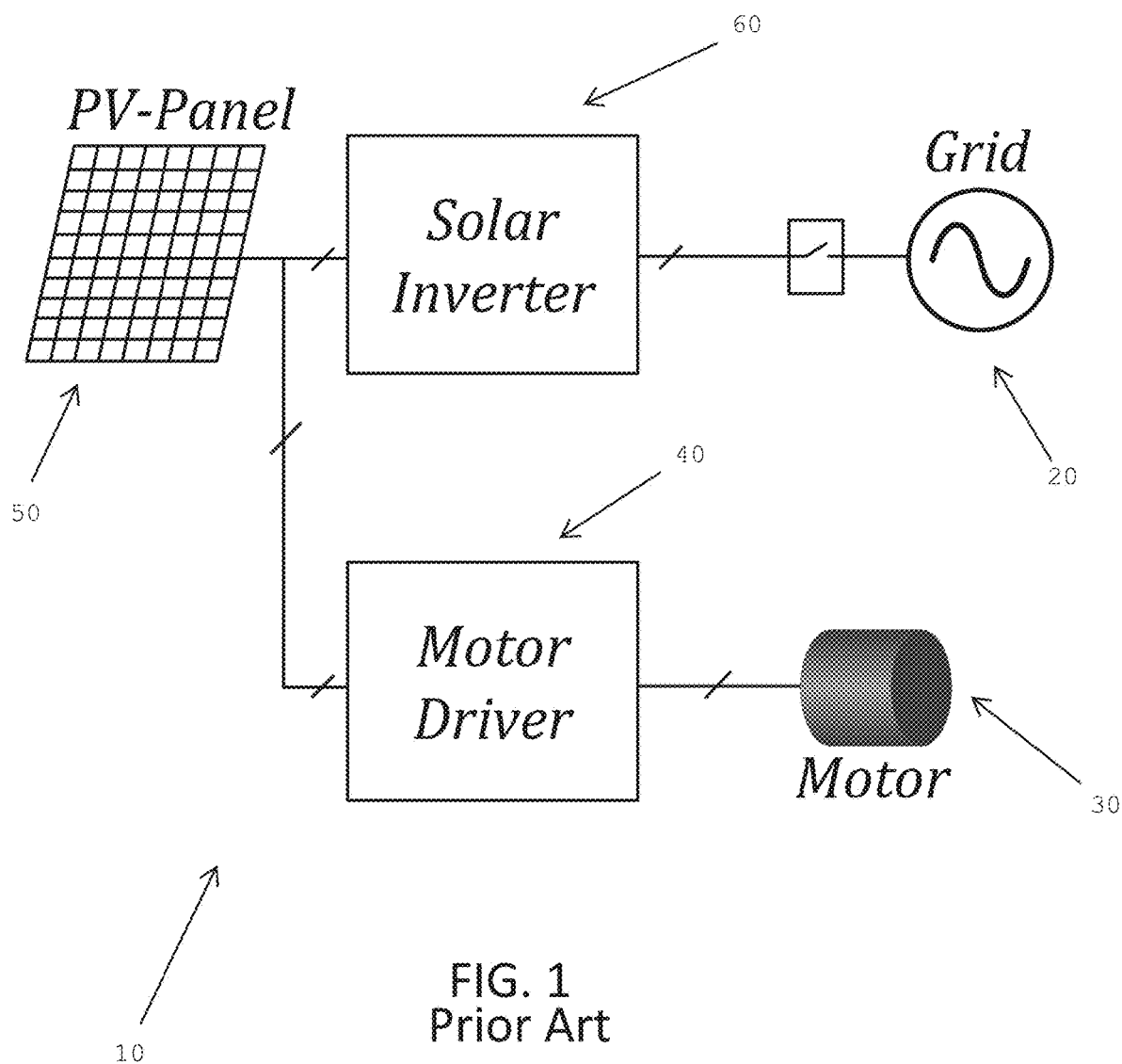
FIG. 1 illustrates a power generation system according to the prior art.

Referring to FIG. 1, a block diagram of a system 10 according to the prior art is illustrated. The system in FIG. 1 shows a conventional structure for a solar energy system connected to a power grid 20 and to one or more electric motor loads 30. As can be seen from FIG. 1, a separate motor driver 40 is required to provide appropriate power from the solar energy harvesting system 10. The motor drive system draws DC power from the PV panels array 50, uses a large energy storage capacitor (not shown) at the PV panels 50, and then converts this voltage to provide the appropriate variable frequency, variable AC power tor the motor 30 to control the motor's position and/or, speed and/or torque. A solar inverter 60 is used to convert the DC power from the PV panels array 50 into the appropriate AC power for the grid 20 when the system 10 is operating in the on-grid mode.

Figure 2:
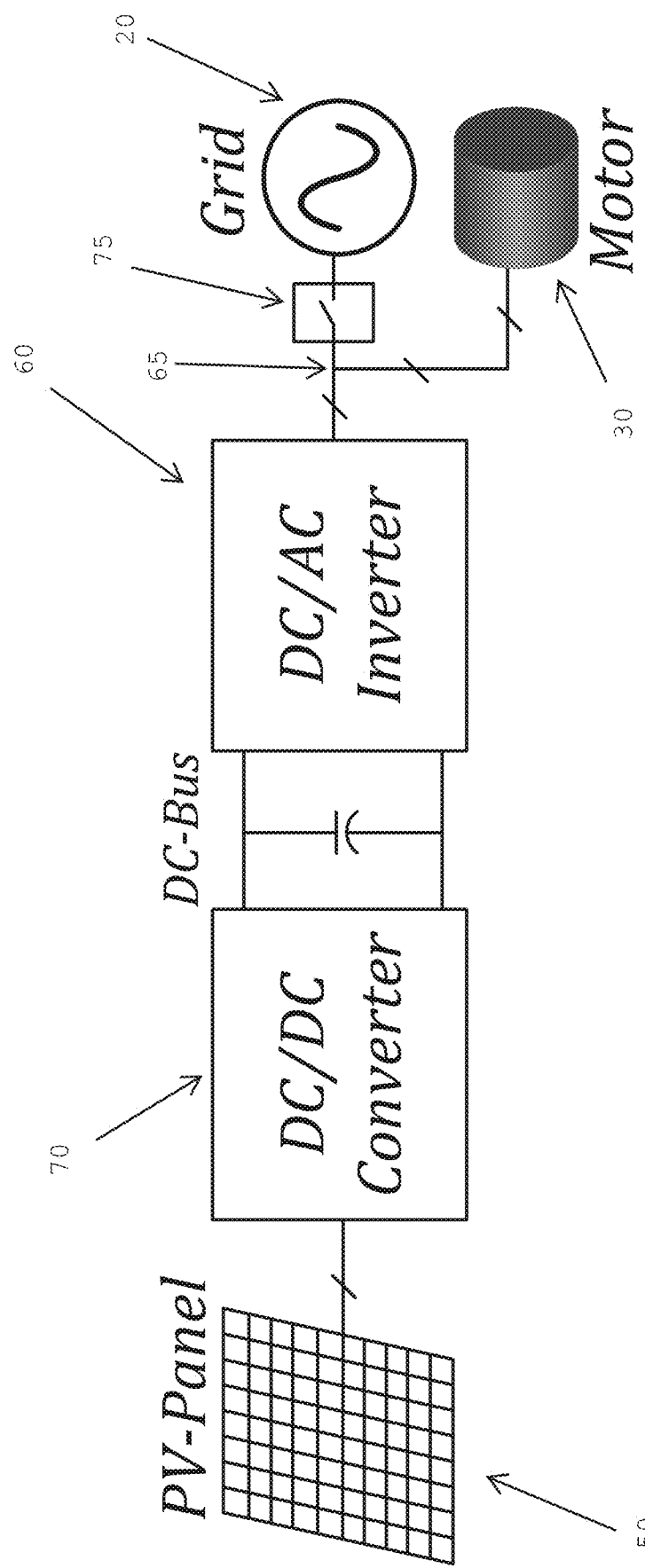
FIG. 2 shows a block diagram of a power generation system according to one aspect of the present invention.

Referring to FIG. 2, illustrated is a block diagram detailing a system according to one aspect of the present invention. This system 10 combines a solar energy harvesting system and a motor drive. The system 10 can operate in a grid-connected mode as well as in a motor drive (off-grid) mode and provides appropriate AC or DC power for the motor and controls its position and/or, speed and/or torque. As can be seen from FIG. 2, the system receives DC power from the PV panels 50. The DC power passes through a DC-DC converter 70 and is received by the DC/AC inverter 60. The resulting AC power passes through the PCC 65 (point of common coupling) and is then passed to either the power grid 20 or to the motor load 30. It should be clear that the state of a switch 75 determines whether the resulting AC power is passed on to the power grid 20 or to the motor load 30.

In operation, the system in FIG. 2 operates depending on whether the switch 75 is open or closed. When AC grid power is present, the switch 75 is closed and the grid AC voltage is applied at PCC. The system senses this voltage and feeds the maximum possible power that can be extracted from the PV panels to the AC grid. The grid supplies the power as demanded by the load. In this scenario, the system is operating in an on-grid mode.

Figure 3:
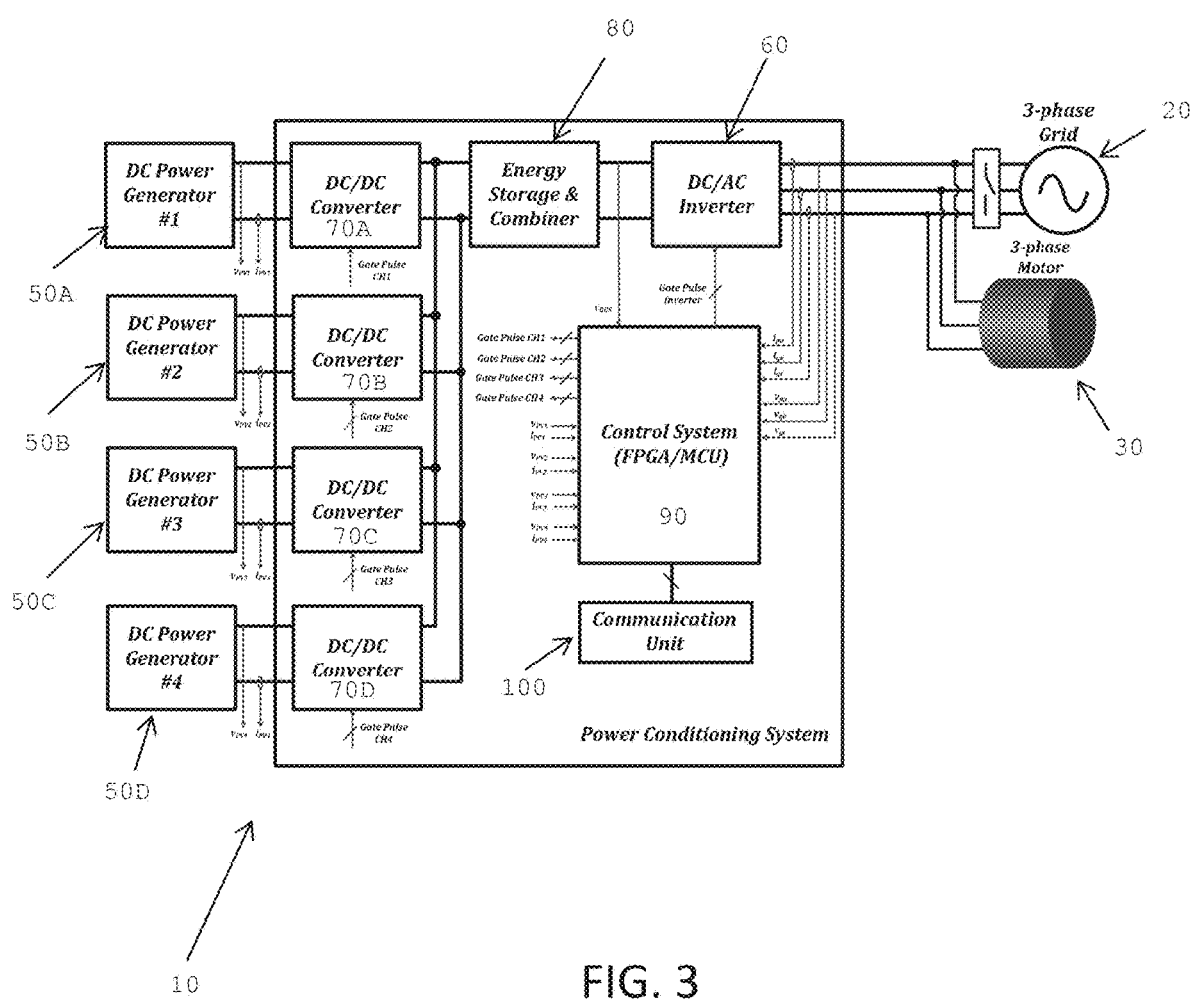
FIG. 3 illustrates a more details block diagram of the system illustrated in FIG. 2.

Referring to FIG. 3, illustrated is a block diagram of the system 10 according to one aspect of the present invention. FIG. 3 shows the system 10 with more details. The system 10 extracts power from one or more Photovoltaic (PV) panels (in this case 4 PV panels) 50A, 50B, 50C, 50D. The system 10 then converts the power to compatible forms either for the grid 20 or for the electric motor 30 by way of the DC/DC converter 70A, 70B, 70C, 70D, and the DC/AC inverter 60. The DC power from the converters 70A-70D is combined and stored in a storage/combiner block 80 before being converted by inverter 60. The control or gate pulses necessary for the correct functioning of the converters 70A-70D and inverter 60 are provided by the control module 90. The control module 90 receives output current and output voltage readings from the inverter 60. In addition, the control module 90 receives output current and voltage readings from each of the PV panels 50A-50D. Based on these inputs, the control module 90 adjusts/produces the relevant gate pulses for the converters 70A-70D and the inverter 60. A communications module 100 may be present to allow users to communicate and control the parameters and behaviour of the control module 90. The system 10 can perform individual maximum power point tracking (MPPT) and can control either the current injected to the grid or control motor state variables (e.g., speed) for the motor load 30. The system 10 uses a two-stage structure for the power system. At the PV side, DC/DC converters are used to perform MPPT. The energy from the PV panels 50A-50D is combined into a fairly small energy storage 80 and a DC/AC inverter 60 is used to convert DC power into the appropriate AC power.

In one implementation, on-grid and off-grid mode is determined by sensing the voltage at the PCC. In operation, detection of a suitable voltage by the system at PCC causes the power generation system to feed as much power as available from the PV panels to the load, thereby changing the voltage at PCC. The control module for the power generation system monitors the AC voltage at PCC and determines the rate of change of this PCC voltage. This change is compared against the change in current fed by the inverter. If the change in voltage of the PCC is greater than a typical change in voltage of the grid, then the control module for the power generation system determines that the power generation system is in off-grid mode. This is because, in the on-grid mode, any power fed into the power grid would not cause a significant change in the voltage since the grid voltage is tightly regulated.

Figure 4:
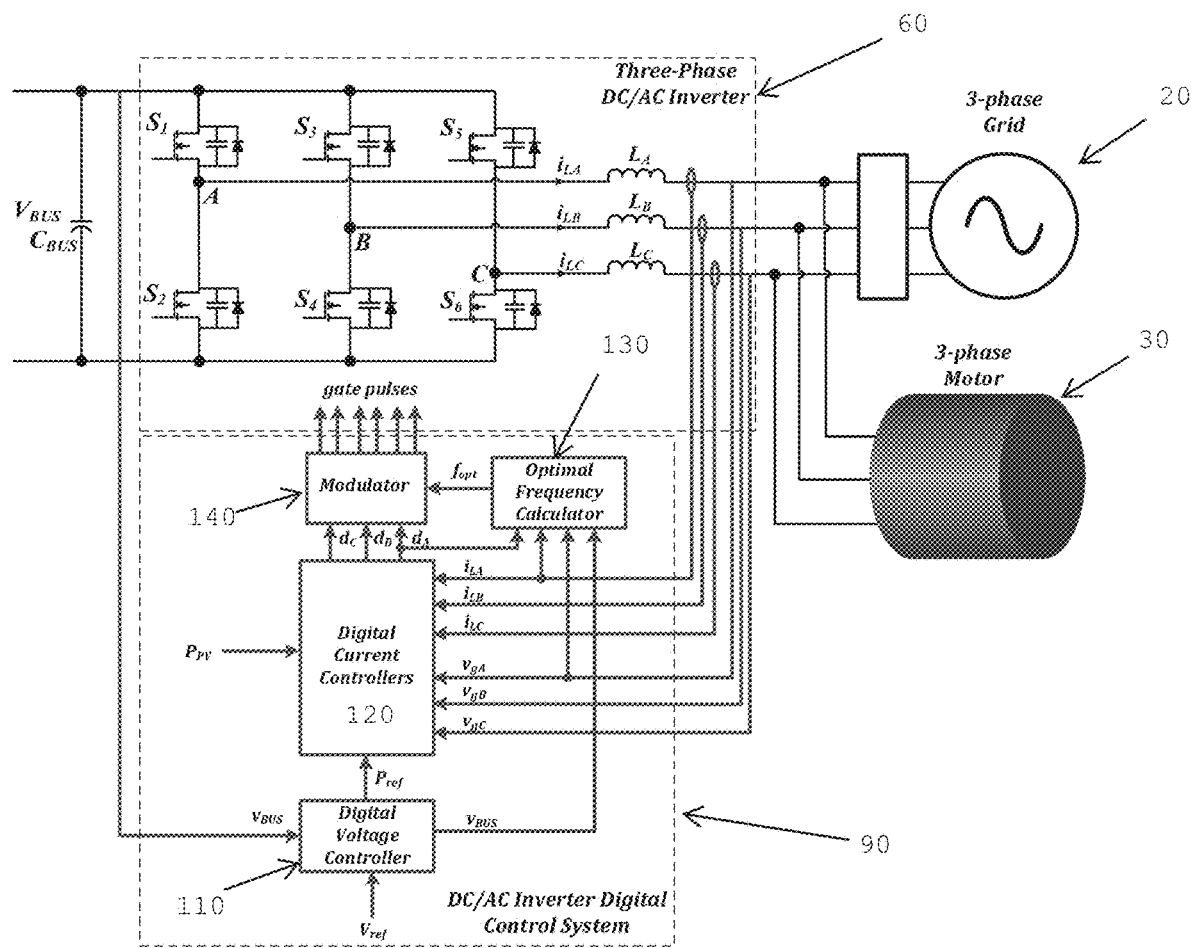
FIG. 4 is a detailed block diagram of the inverter and the control module according to one aspect of the present invention.

Referring to FIG. 4, a block diagram of the closed-loop control system for the hybrid solar/motor drive is shown. As can be seen, the components of the control module 90 cooperate with the switches/power transistors within the inverter 60 to produce three-phase AC power suitable for use by either the grid 20 or the motor load 30. From FIG. 4, the closed-loop control system in the control module 90 includes four main blocks: a digital voltage controller 110, a digital current controller 120, an optimal frequency calculator 130, and a modulator 140. The digital voltage controller 110 effectively determines the available power from the PV panels 50A-50D. This block 110 ensures that the harvested power from the PV panels 50A-50D extracted by the first stage (the DC-DC converters 70A-70D) is transferred to the output (i.e., either the grid 20 or the motor 30). The digital current controller block 120 receives the three-phase output voltages and currents from the output of the inverter 60 and generates the appropriate duty cycles for the power semiconductors in the inverter 60. The optimal switching frequency calculator block 130 determines the optimal switching frequency of the inverter 60 using the AC voltage and current from the inverter 60 and the DC bus voltage. Finally, the modulator 140 generates the appropriate gate pulses for the power semiconductors in the inverter 60 according to the generated duty cycles and switching frequency from the block 130. It should be clear that one or more other modulators (not shown) may be present to provide appropriate gate pulses for the power semiconductors in the converters 70A-70D based on input from the various components of the system.

It should be clear that the control module 90 may include an off-grid power tracker block (not shown) that operates as part of the control module to control the DC/DC converters. This power tracker block adjusts the output power of the system based on load power demand up to the maximum available power from the PV panel (i.e., it performs MPPT). The amount of the extracted power from the PV panels is a function of the amplitude of the load voltage.

For clarity, the system senses/samples power related data from its components and uses this power related data to determine mode of operation data that determines the mode of operation of the power generation system. The power generation system can be operated as either on grid (coupled to the power grid) or as off-grid (disconnected from the power grid and powering the motor load). The system continuously samples the incoming power related data to adjust the operation of the various components as needed.

It should be clear that the DC/AC inverter 60 is well-known in design and function. The inverter 60 receives DC power from the combiner/storage module 80 and converts this into three-phase AC power which can be used by either the grid 20 or the motor load 30.

Figure 5:
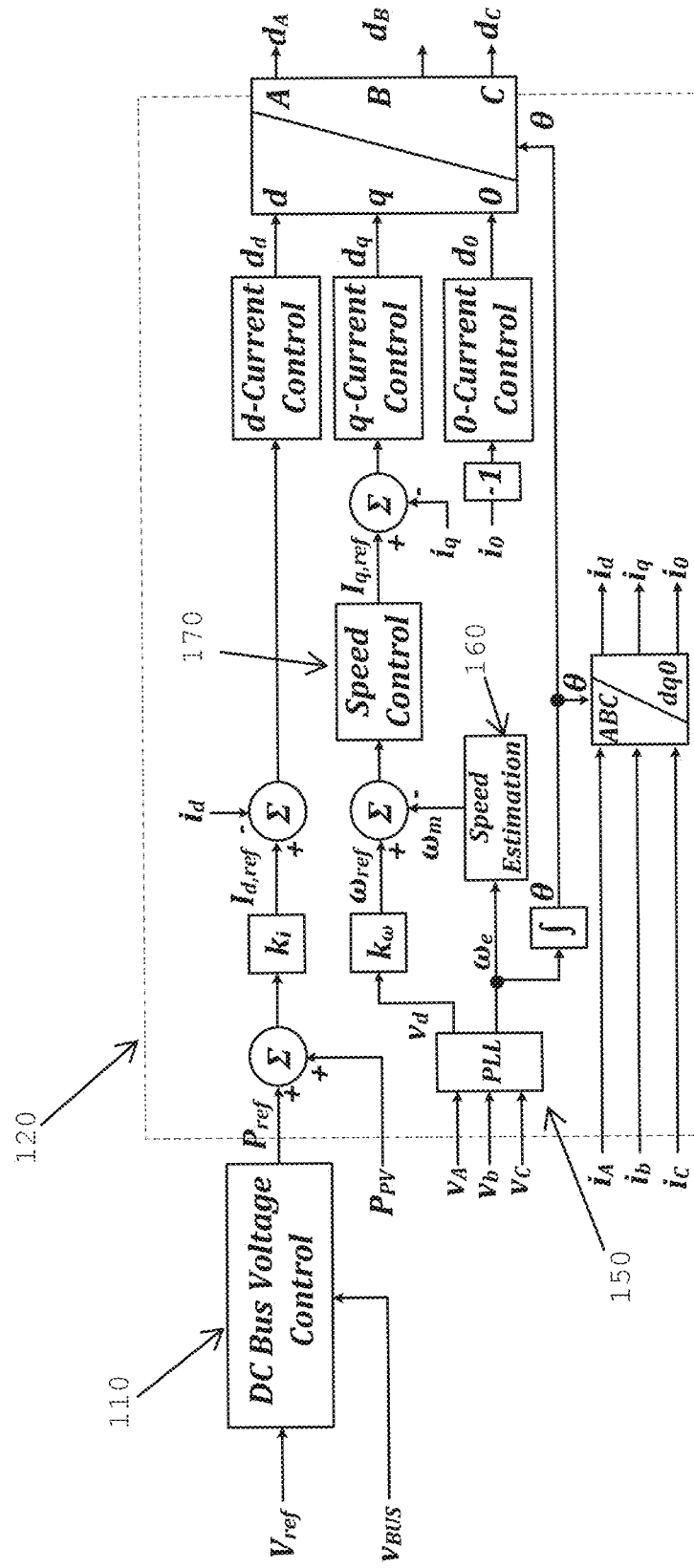
FIG. 5 is a block diagram of a current controller as used in the control module illustrated in FIG. 4.

Referring to FIG. 5, a detailed block diagram of a current controller for use when the system is in off-grid mode is illustrated. As can be seen from FIG. 5, the DC bus voltage controller 110 determines the reference value $P_{ref}$ for the DC power received from the PV panels 50 based on the DC bus voltage feedback $V_{BUS}$ and the DC bus voltage reference $V_{ref}$. This controller 110 ensures that all the harvested power is transferred to the output by regulating the DC bus voltage. The reference value $P_{ref}$ for the power generated from the DC bus voltage controller is superimposed by a feedforward term, $P_{PV}$ from the first stage DC/DC converter 70 or directly from the PV panels 50. This feedforward term can significantly improve transient performance of the DC bus controller by giving more predictability. As an example, if the harvested power from the PV panel is suddenly increased, this term will increase the output power command to effectively increase the output power without having wait for the DC bus controller to sense the increase in the input power by sensing the increase in the DC bus voltage.

Returning to FIG. 5, once the power reference signal $P_{ref}$ is received, this total power reference signal is then multiplied by a coefficient $k_i$ to create the reference value for the direct-axis current, $I_{d,ref}$. The result of subtracting the sensed direct axis current $i_d$ from the direct-axis current reference value is used to produce the direct-axis duty cycle $d_d$. Direct-axis current is proportional to the active power.

To control the motor load values, reference values and estimates for the motor speed are determined. A reference value for the motor speed, i.e. $\omega_{ref}$, is calculated by multiplying the direct axis voltage component $v_d$ of the AC side of the inverter using a phase lock loop (PLL) block 150 by another coefficient $k_\omega$. Also from the PLL 150, an estimated value $\omega_e$ is generated and this is used to estimate the speed of the motor by a speed estimation block 160. The speed estimation block 160 produces the estimated motor speed $\omega_m$ that is subtracted from the motor speed reference value $\omega_{ref}$. The result is used by the speed control block 170 to produce the quadrature axis current reference $I_{q,ref}$. It should be clear from the Figure that the estimated value $\omega_e$ is the frequency θ of the inverter output voltage.

As can be seen from the Figure, the direct axis component of the AC side voltage is shown by $V_d$ and its value increases in accordance with the increase in the direct-axis current component, $I_{d,ref}$. Performance of the speed controller in the system relies on the availability of power from the PV panels. In other words, if there is considerable power available from the PV panel, the motor speed command is increased. Similarly, if there is less power available, the speed command is decreased accordingly. It should be clear that the control module 90 includes an external DC bus controller 110, which determines the reference signals $P_{ref}$ for the direct current axis component $I_{d,ref}$. It should also be clear that the control module 90 uses a speed control loop that estimates the speed feedback from the frequency of the output voltage of the inverter using the PLL to generate the quadrature axis current reference, i.e. $I_{q,ref}$. The quadrature axis duty cycle is calculated from the result of subtracting the sensed quadrature axis $i_q$ current from the quadrature axis current reference $I_{q,ref}$.

Again returning to FIGS. 4 and 5, it can be seen that the resulting dq current components ($d_d$ and $d_q$) are then translated into the duty cycles ($d_A$, $d_B$, and $d_C$) for the various phases of the three phase power signal and these are, in turn, converted into the appropriate reference signals with appropriate frequency and amplitudes through the current controller loops. These reference or intermediate control signals are then used to generate the gate pulses that control the switching actions of the inverter. It is worth mentioning that a zero-current component $i_0$ controller loop is also added in the control system to cancel the effects of circulation current among the inverter modules when operating in parallel mode.

Figure 6:
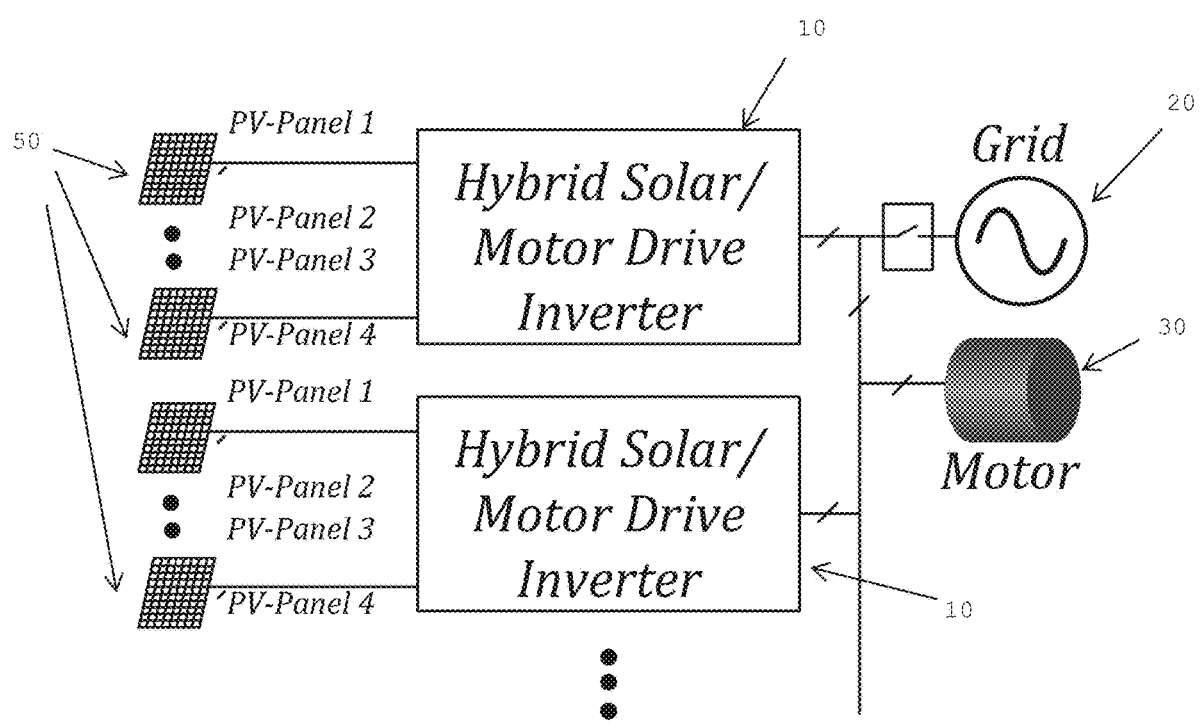
FIG. 6 illustrates multiple instances of the system coupled in parallel to multiple renewable energy sources.

The various aspects of the present invention enable multiple inverters to operate in parallel. Referring to FIG. 6, illustrated are multiple hybrid solar/motor drive modules coupled in parallel. The control structure used in the present invention allows for seamless operation of multiple modules and enables the scalability of the system for higher power needs and increases the system reliability in case of any failures.

Referring to FIG. 3, a three-phase inverter is used to convert DC power to appropriate AC power either for the grid or for the motor. The control system of the three-phase inverter is of great importance and allows for multi-mode (grid-connected mode and motor drive mode) operation of the three-phase inverter. It should be clear that, while the implementation explained above uses PV panels as the renewable energy source, other renewable energy sources (including wind turbines, wave motion power generators, and others) may also be used. As well, it should be clear that the above described system may be used to power and/or control various disparate types of motors including induction motors, synchronous motors, Brushless DC (BLDC) motors, and Permanent Magnet Synchronous (PMS) motors. The system may be used to provide power to multiple motors simultaneously and these various motors may be coupled in parallel or in series to one another and to the system.

Figure 7:
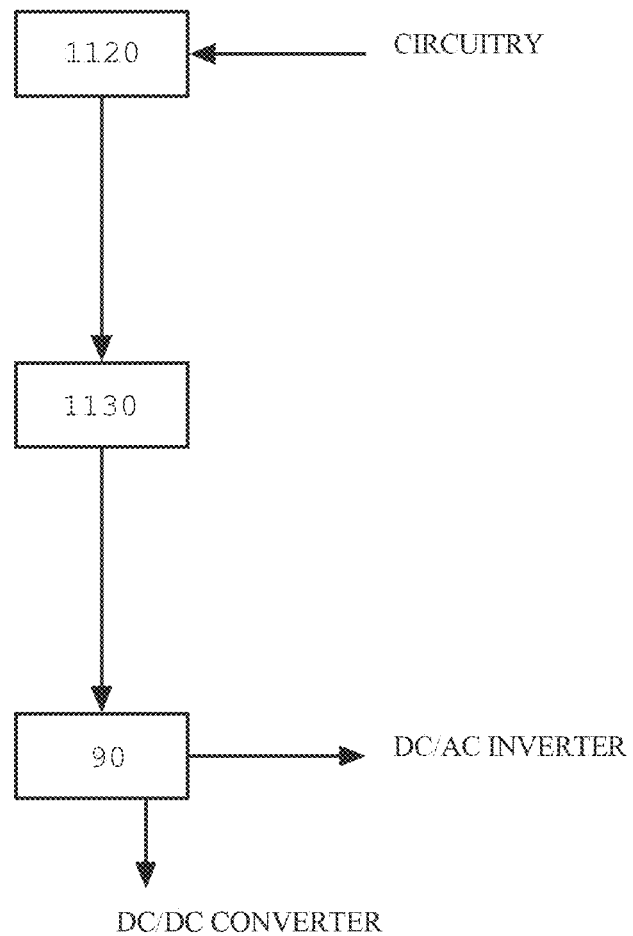
FIG. 7 is a flowchart detailing the steps in a method for determining if the power generation system according to one aspect of the invention is operating in on-grid mode or in off-grid mode.

Referring to FIG. 7, a schematic block diagram of a subsystem that determines the operating mode of the system illustrated in FIG. 2 is presented. In this subsystem 1110, a sensing module 1120 receives power related data from various portions of the system illustrated in FIG. 2. The sensing module can receive voltage readings, current readings, from, for example, a PCC (point of common coupling) 65, the inverter 60, and the terminals of the converters 70. Of course, since the amounts being measured are analog values, the sensors receiving these readings will have their data converted by an A/D converter to ensure that the sensed values are properly digitized and therefore usable by a suitable data processing device. Once the sensing module 1120 has received the digitized data, this data is then sent to a suitable data processing module 1130 that processes the data received. The data is then used by the data processing module 1120 to calculate mode of operation data. This mode of operation data calculated by the data processing module is determinative of the mode of operation of the power generation system shown in FIG. 2. Once the mode of operation has been determined, suitable control commands are then sent from the data processing module 1120 to the control module 90 that controls the functions of the various components of the power generation system. As an example, the control commands may be sent to control module 90 to adjust the gate pulses for the DC/AC inverter 60 and/or the DC/DC converter 70. These control commands can then be used to properly operate the different components of the power generation system.

Figure 8:
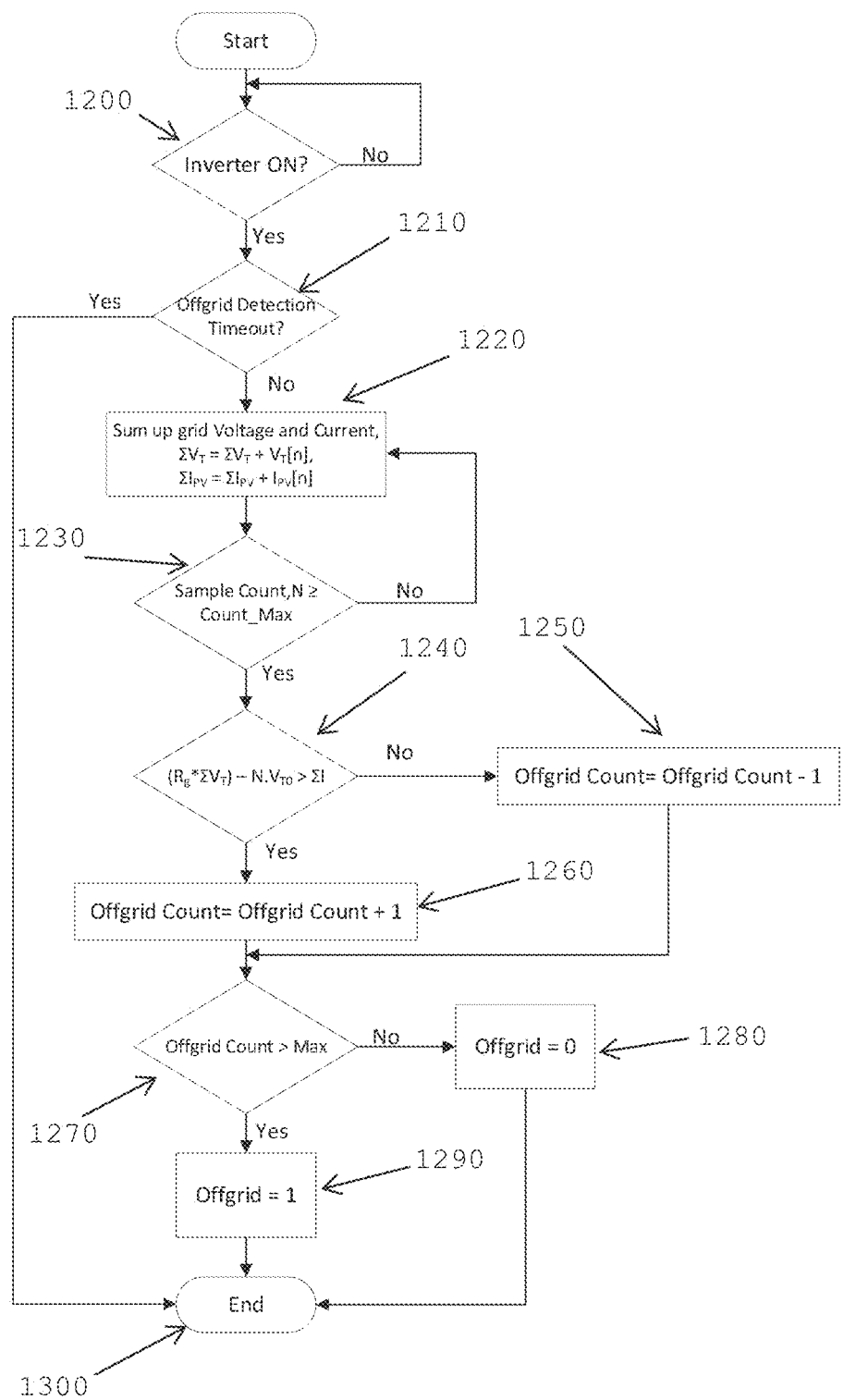
FIG. 8 is schematic block diagram detailing a control flow for the power generation system according to one aspect of the present invention.

To determine whether the power generation system is in on-grid or off-grid mode, the subsystem in FIG. 7 implements a method as detailed in FIG. 8.

Referring to FIG. 8, the method to determine whether the power generation system is in on-grid or off-grid mode begins at step 1200, that of determining if the DC/AC inverter is on. If the inverter is not on, then the process keeps looping to step 1200. Once the inverter has been detected as being in operation, step 1210 is that of determining if the off-grid detection process has timed out. This means that the time frame for determining if the power generation system is on-grid or off-grid has expired. If this time frame has expired, then the process ends. If, however, the time frame has not yet expired, then step 1220 is that of performing a summing function to sum up the voltage and current readings from the terminals of the inverter. Step 1230 then determines if a sufficient number of samples have been taken/read. If an insufficient number of samples have been taken, then the process continuously loops back to step 1220 to gather (and sum) more voltage and current readings from the inverter's terminals.

Once a sufficient amount of readings have been taken and summed, the process continues to step 1240, that of determining if mode of operation data meets a threshold or not. If the threshold is not met (i.e., the condition checked by step 1240 is FALSE), then step 1250 decrements a counter that counts how many instances of an off-grid condition has occurred and the process jumps to step 1270. On the other hand, if the condition checked by step 1240 is TRUE, then step 1260 increments the counter that counts the occurrences of off-grid condition happening. Step 1270 then checks to see if the number of off-grid occurrences has exceeded a given maximum.

In the event that step 1270 determines that the maximum number of off-grid occurrences has not been met, then the process determines that the power generation system is in the on-grid operating mode (step 1280) and the process ends. Conversely, if step 1270 determines that the maximum number of off-grid occurrences has been exceeded, then the power generation system is in the off-grid operating mode (step 1290) and the process ends (step 1300).

As can be seen from the flowchart, the mode of operation (i.e. on-grid or off-grid) is determined based on the change in the load voltage amplitude.

For greater clarity regarding the general operation of the power generation system according to one aspect of the present invention, the reader is directed to the U.S. patent application Ser. No. 16/391,730 (US Patent Application Publication US 2020/0343728), the contents of which are hereby incorporated by reference.

For clarity, the control circuitry that determines the operating mode for the power generation system can include a suitable data processing module to perform the calculations and to execute the methods detailed in the enclosed flowcharts. This data processing module may be implemented as a dedicated ASIC (application specific integrated circuit) or as a general purpose data processor (e.g. a microcontroller).

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps.

As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for delivering power from a renewable energy source to at least one destination in either an on-grid mode or an off-grid mode, the system comprising:
a plurality of DC/DC converters, each one of said DC/DC converters being coupled to receive DC power from a distinct renewable energy source;
an energy storage and combiner module receiving power outputs of all of said plurality of DC/DC converters;
a single three-phase DC/AC inverter receiving an output of said energy storage and combiner module, said output of said energy storage and combiner module being a combination of all said power outputs of all of said plurality of DC/DC converters, and producing three-phase AC power; and
a control subsystem receiving output current and output voltage readings from said three-phase DC/AC inverter, said control subsystem providing gate control signals to said three-phase DC/AC inverter and to each of said plurality of DC/DC converters,
wherein
when said system is in said on-grid mode, said three-phase AC power from said three-phase DC/AC inverter is delivered to a power grid;
when said system is in said off-grid mode, said three-phase AC power from said three-phase DC/AC inverter is delivered to at least one electric motor; and
said control subsystem includes a current controller block that, during off-grid mode, outputs intermediate control signals used to determine said gate control signals, said intermediate control signals being based on sensed current and voltage values from said three-phase DC/AC inverter, said sensed current and voltage values being indicative of a performance of said at least one electric motor.

2. The system according to claim 1, wherein an off-grid mode or an on-grid mode is based on a voltage sensed at a specific node where said power grid couples to said system.

3. The system according to claim 1, wherein said at least one electric motor is at least one of: a PMDC (permanent magnet DC) motor, a BLDC (brush-less DC) motor, an induction motor, and a synchronous motor.

4. The system according to claim 1, wherein multiple instances of said system are coupled in parallel to operate to provide power from multiple renewable energy sources to a plurality of motor loads.

5. The system according to claim 1, wherein said current controller block receives indications of current and voltage outputs directly from said renewable energy source as feed-forward values.

6. The system according to claim 5, wherein said feed-forward values are used to increase or decrease output power based on power outputs of said renewable energy source.

7. The system according to claim 1, wherein an estimated speed of at least one electric motor is partly based on a frequency of output voltages sensed from said three-phase DC/AC inverter.

8. The system according to claim 7, wherein said frequency of output voltages sensed from said three-phase DC/AC inverter is determined using a PLL (phase locked loop) block that receives said output voltages from said three-phase DC/AC inverter.

9. The system according to claim 1, wherein said control subsystem includes a voltage bus controller that provides a power reference value $P_{ref}$ for DC power received from said renewable energy source to said current controller block.

10. The system according to claim 9, wherein said power reference value is based on a DC bus voltage feedback signal $V_{BUS}$ and a DC bus voltage reference $V_{ref}$ signal.

11. The system according to claim 1 wherein said control subsystem includes a frequency calculator block receiving indications of current and voltage outputs of said three-phase DC/AC inverter and at least one intermediate control signal from said current controller block, said frequency calculator block being for calculating optimal frequencies for use in controlling said three-phase DC/AC inverter.

12. The system according to claim 11, wherein said control subsystem includes a modulator block receiving said intermediate control signals from said current controller block and optimal frequency outputs of said frequency calculator block, said modulator block being for producing said gate signals.

13. The system according to claim 12, wherein said intermediate control signals comprise duty cycles for use with a three phase power output of said system.

14. A method for controlling at least one motor load coupled to a power generation system, the method comprising:
- receiving reference power values indicative of DC power received from a plurality of energy sources;
- receiving indications of current and voltage outputs from said plurality of energy sources as feedforward values;
- using said feedforward values, said reference power value, and a sensed direct axis current to produce a direct axis duty cycle;
- receiving output voltage values from a single three-phase inverter within said power generation system, said three-phase inverter producing three-phase AC power from DC power received from said plurality of enemy sources, said three-phase AC power being for use by said at least one motor load;
- estimating a frequency of said voltage values;
- using said frequency as an estimated speed of said at least one motor load, producing a quadrature axis duty cycle using said estimated speed, a sensed quadrature axis current, and a motor speed reference value; and
- converting said direct axis duty cycle and said quadrature duty cycle to produce gate control signals for power semiconductors in said inverter;

wherein each of said plurality of energy sources is coupled to one of a plurality of dedicated DC/DC converter within the power generation system and each of said plurality of dedicated DC/DC converters is coupled to an energy storage and combiner module, said single three-phase inverter receives DC power from said plurality of energy sources by way of said enemy storage and combiner module, and said energy storage and combiner module receives outputs of all of said plurality of dedicated DC/DC converters and combines said outputs into DC power for use by said single three-phase inverter.

15. The method according to claim 14, wherein said direct axis duty cycle and said quadrature duty cycle are converted to said gate control signals using an optimal frequency calculator and a modulator.

16. The method according to claim 15, wherein said optimal frequency calculator calculates an optimal frequency using at least said current and voltage outputs of said three-phase inverter.

17. The method according to claim 14, wherein said at least one energy source is a renewable energy source.

18. The method according to claim 14, wherein said power generation system is coupled to a power grid such that said power generation system executes said method when said power generation system is disconnected from said power grid.

19. The method according to claim 14, wherein said voltage values are estimated using a phase locked loop (PLL) module that receives said voltage values.

* * * * *